Patented Jan. 5, 1932

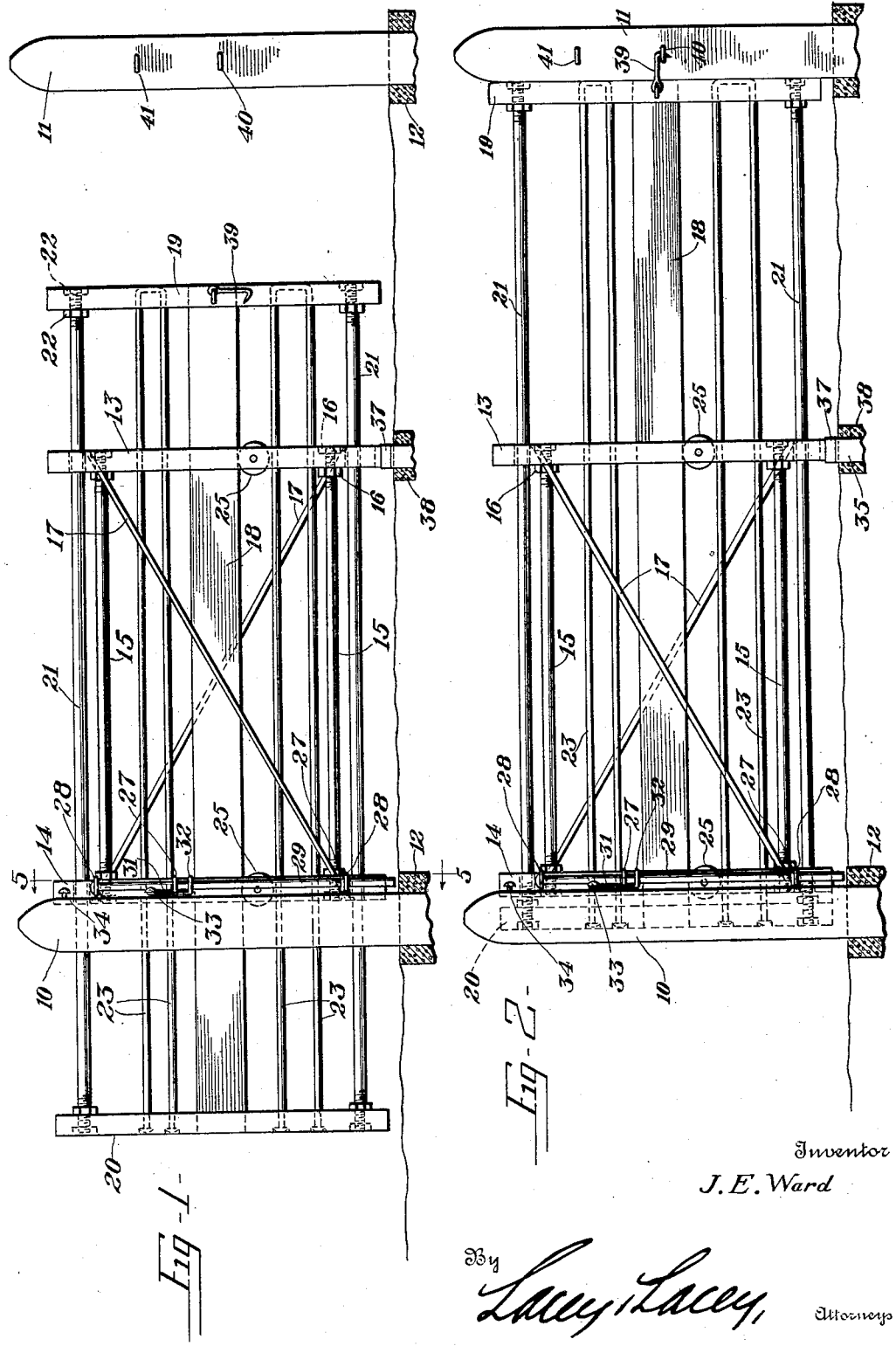

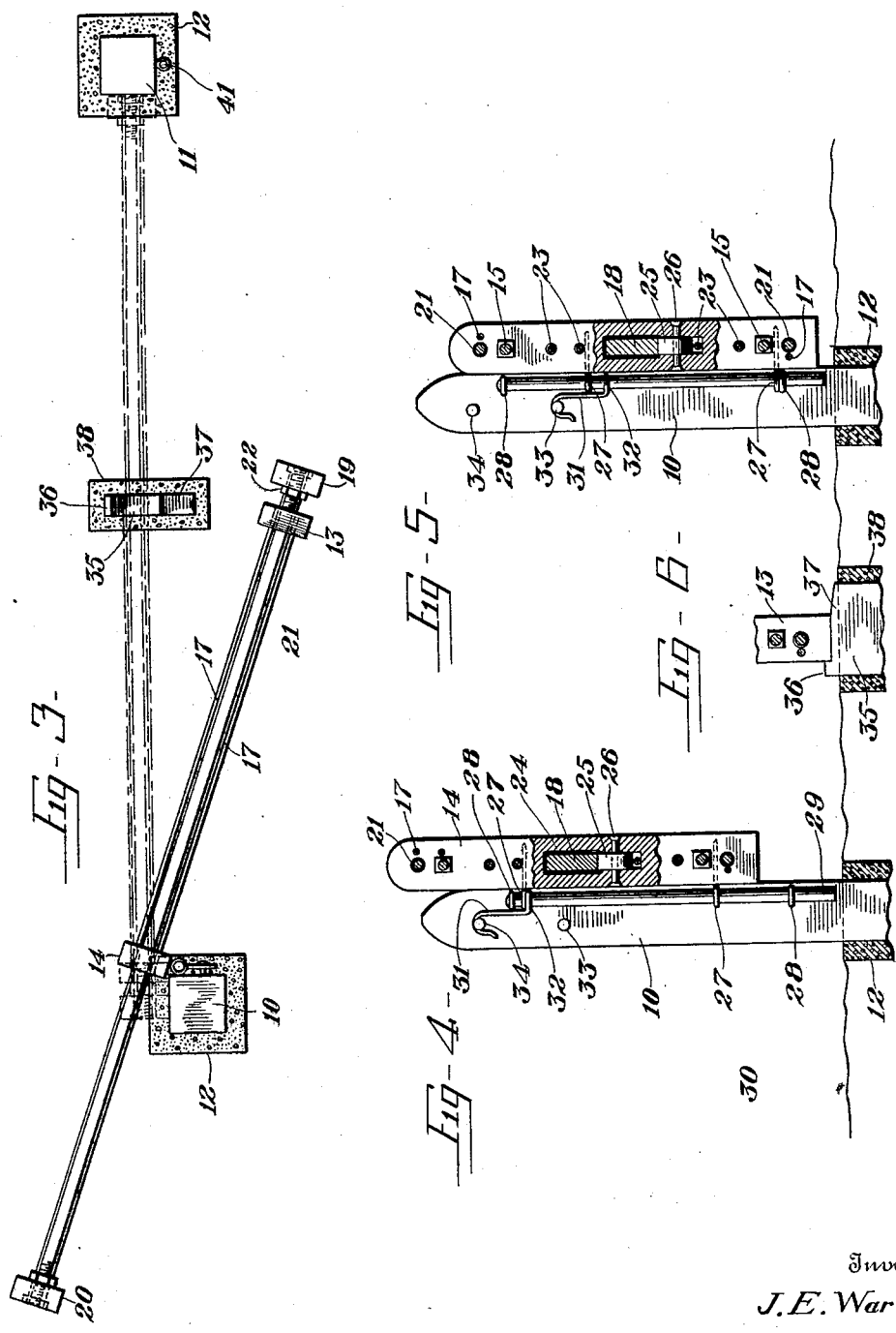

1,839,624

UNITED STATES PATENT OFFICE

JAMES ELBERT WARD, OF ROCKFORD, MICHIGAN

GATE

Application filed May 23, 1930. Serial No. 455,041.

This invention relates to gates and has for an object to provide a main gate frame which swings on hinges, and carries a sliding wicket for the use of pedestrians, and for other purposes requiring the opening of only a narrow passage way.

A further object of the invention is to relieve the gate post of lateral strain thereon when the gate stands open and at the same time provide a gate which will be equally counter-poised when opened, whereby the gate may be swung to and fro with the slightest pressure.

A further object of the invention is to provide a gate having novel hinges which permit of the gate being raised vertically and there held securely so as to be elevated above the snow level in winter.

A further object of the invention is to provide a gate which is strong and light, simple in construction, easily operated, and not liable to sag or otherwise get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a view in elevation showing the wicket open,

Figure 2 is a view in elevation showing the gate closed,

Figure 3 is a plan view showing the gate partly swung open on its hinges,

Figure 4 is a cross sectional view showing the gate in raised position above the snow level, Figure 5 is a cross sectional view on the line 5—5 of Figure 1, and Fig. 6 is a cross section showing the connection of the middle upright with the sill support.

Referring now to the accompanying drawings in which like characters of reference designate similar parts in the various views, 10 designates a gate post to which the swinging frame is hinged, and 11 indicates the opposite gate post with which the gate moves into engagement when the gate is closed. Both posts are preferably formed rectangular in cross section and are preferably embedded in cement as shown at 12.

The swinging frame of the gate preferably consists of spaced uprights 13 and 14 which are preferably rectangular in cross section and are connected by horizontally disposed tubular rods 15, the ends of which are passed through the uprights and rigidly secured thereto by nuts 16 which are threaded onto the ends of the tubular rods. Diagonal brace rods 17 also connect the uprights 13 and 14, these rods being terminally secured to the uprights in any preferred manner. It will be observed that the rods are spaced laterally, as best shown in Figures 4 and 5, to receive therebetween the longitudinal supporting rail 18 of the wicket, as will now be described.

The slide section of the gate or wicket is composed of spaced uprights 19 and 20 which are connected by tubular rods 21, the ends of which are passed through the uprights and rigidly secured thereto by means of nuts 22. Longitudinal rods 23 are also terminally secured to the uprights and extend parallel with the tubular rods 21. The above mentioned longitudinal rail 18 is preferably rectangular in cross section as are the uprights 19 and 20, and is preferably formed of wood as are the uprights. The rail is slidably received in guide openings of rectangular cross section 24 formed in the swinging frame uprights 13 and 14, and disposed in these openings below the rail are rollers 25. The rollers are mounted on stub shafts 26 and form anti-friction bearings which engage the bottom edge of the rail 18 and slidably support the wicket on the main frame.

The main frame of the gate is hinged to the post 10 so that it may work equally well in normal position as shown in Figure 5, or in raised position as shown in Figure 4, and for this purpose the upright 14 of the main frame is equipped with upper and lower hinge eyes 27 through which and similar eyes 28 carried by the gate post 10 a pintle 29 is passed to hingedly secure the gate to the post. The hinge eyes 27 of the gate are located between the hinge eyes 28 of the post so that, as best shown in Figures 4 and 5, the gate may be swung open or closed when in normal or lowered position, as shown in Figure 5, or when elevated vertically above the snow level 30, as shown in Figure 4.

For holding the gate in elevated position, a hook 31 is provided at the lower end with an eye 32 which encircles the pintle 29 below the upper hinge eye of the gate frame. A pin 33 carried by the post 10, as shown in Figure 5, receives the hook when the gate is in normal position. Obviously, the gate may be manually raised vertically on the pintle whereupon the hook 31 may be engaged over a pin 34 carried by the post 10 in which position the eye 32 of the hook engages against the underneath face of the upper hinge eye 27 of the gate frame and supports the gate in raised position while permitting of the gate to be readily swung to and fro.

Disposed intermediate the gate posts 10 and 11 is a sill post 35 having a shoulder 36 and having a beveled portion 37 which serves to guide the upright 13 of the hinged main frame against the shoulder. The sill post prevents the main frame from sagging under the weight of the wicket and the shoulder serves as a stop to arrest the gate at the proper place when it is swung shut. The sill post is also preferably embedded in cement 38. The wicket upright 19 is provided with a pivoted hook 39 and the gate post 11 is provided with a pair of staples 40 and 41 to engage the hook for holding shut both the main frame and the wicket when the gate is closed either in normal position or in raised position.

It will be observed that the upright 19 of the wicket is disposed in front of the upright 13 of the main frame, while the upright 20 of the wicket is disposed in rear of the upright 14 of the main frame. By means of this construction the play or sliding movement of the wicket is limited by its uprights coming into contact with the uprights of the main frame.

When pedestrians wish to pass the gate, it is only necessary to slide back the wicket, but when vehicles or droves of animals are to pass, the main frame must be swung open carrying the wicket with it.

By means of the rail 18 being substantially rectangular in cross section and fitting in correspondingly shaped openings in the uprights of the main frame, the wicket is prevented from dragging when the gate is unlocked or said wicket is being moved. The anti-friction rollers upon which the rail 18 bears permits of the wicket being slid in or out by the slightest pressure.

In order to open the gate it is only necessary to slide the wicket until the vertical upright 19 engages with the vertical upright 13 of the main frame. The wicket will then have moved just about one-half of its length and the gate will be counter-poised or balanced, as shown in Figure 3. When in this position, the gate may easily be opened to full width by very little power and the same will swing freely, for the gate being balanced, the hinged main frame will readily swing to and fro.

By thus constructing my improved gate, the excessive lateral strain, when the gate stands open, is removed from the gate post, since the gate being balanced when open, the weight is equally distributed on each side of the gate post. Consequently, the post and adjoining portion of the fence are not loosened.

Having thus described the invention, I claim:

A gate comprising a main frame having vertical uprights at the ends thereof connected by longitudinal tubular rods, a pair of rollers carried in openings of rectangular cross section formed in said uprights, a wicket having terminal uprights connected by longitudinal tubular rods adapted to slide longitudinally through orifices in the uprights of the main frame, a longitudinal supporting rail of substantially rectangular cross section connecting said wicket uprights and slidably mounted in said guide openings above said rollers, the lower edge of said rail bearing upon said rollers, said terminal uprights of the wicket being adapted to engage said terminal uprights of the main frame and limit sliding movement of the wicket in both directions, said wicket when fully opened serving as a counter-poise for balancing the weight of said main frame, a hinge post, a pintle carried thereby, and hinge eyes carried by the main frame encircling said pintle.

In testimony whereof I affix my signature.

JAMES E. WARD. [L. S.]